United States Patent [19]

Wright

[11] Patent Number: 4,621,024

[45] Date of Patent: Nov. 4, 1986

[54] METAL-COATED HOLLOW MICROSPHERES

[75] Inventor: Frederick A. Wright, Chattanooga, Tenn.

[73] Assignee: Paper Applications International, Inc., Chattanooga, Tenn.

[21] Appl. No.: 687,997

[22] Filed: Dec. 31, 1984

[51] Int. Cl.[4] ............... B05D 1/36; B05D 7/00; B32B 5/16; B32B 9/00

[52] U.S. Cl. ............................ 428/404; 427/204; 427/205; 427/214; 427/221; 428/406; 428/407; 428/405

[58] Field of Search ............ 427/205, 214, 221, 204, 427/404; 428/405, 406, 407

[56] References Cited

U.S. PATENT DOCUMENTS

| | | | |
|---|---|---|---|
| 3,258,477 | 6/1966 | Plueddemann et al. | 260/448.8 |
| 3,365,315 | 1/1968 | Beck et al. | 106/40 |
| 3,649,320 | 3/1972 | Yates | 106/287 |
| 3,699,050 | 10/1972 | Henderson | 252/317 |
| 3,796,777 | 3/1974 | Netting | 264/13 |
| 3,915,735 | 10/1975 | Moreland | 106/308 Q |
| 3,917,547 | 11/1975 | Massey | 428/406 X |
| 3,988,494 | 10/1976 | McAdow | 427/214 X |
| 4,137,367 | 1/1979 | Sample, Jr. et al. | 428/443 |
| 4,141,751 | 2/1979 | Moreland | 427/216 X |
| 4,143,202 | 3/1979 | Tseng et al. | 428/406 |
| 4,336,284 | 6/1982 | Wallace | 428/405 X |
| 4,455,343 | 6/1984 | Temple | 428/285 |
| 4,496,475 | 1/1985 | Abrams | 252/514 |

*Primary Examiner*—Michael R. Lusignan
*Attorney, Agent, or Firm*—Cushman, Darby & Cushman

[57] ABSTRACT

A process for preparing a metal-coated hollow microsphere comprising the combination of steps of: (a) vigorously admixing a major quantity of hollow cenospheres/microspheres with a thermo-setting binder adhesive until the cenospheres are wet-out; (b) slowly adding metal flakes to the thus wet-out cenospheres of step (a) until the wet-out cenospheres are fully coated with the metal flakes; (c) binding the metal flakes to the said wet-out cenospheres by slowly increasing the temperature of the metal coated wet-out cenospheres from step (b), the temperature being raised up to about 350° F.; and (d) the metal-coated cenospheres of step (c) are intermittently admixed in the absence of any further heating until dry. The dry product is ready for packaging.

20 Claims, No Drawings

METAL-COATED HOLLOW MICROSPHERES

The present invention relates, broadly, to metal-coated microspheres. More particularly, the present invention relates to hollow microspheres having exposed metallic particles bound by a thermosetting adhesive material to the hollow microspheres.

BACKGROUND OF THE INVENTION

As general background information, the following are mentioned.

U.S. Pat. No. 4,137,367 (1979) discloses phyllosilicate minerals which are superficially etched with dilute acid to remove an outer octahedrol layer under specific conditions to preserve structural integrity. The acid etch is said to expose silanol groups receptive for subsequent condensation with an organo-silane in a suitable solvent under mild conditions.

As is also known, cellular glass pellet cores have been bonded to and coated with fly ash particles. Such pellets are rather large, on the order of 0.5 to 20 mm. Such materials are described in U.S. Pat. No. 4,143,202.

Various coupling agents composed of organo-functional silanes plus an amine silicate and treatments therewith of reinforcing fibers are also known. Such an amine silicate component has a degree of polymerization less than 1000. It is said in U.S. Pat. No. 3,649,320 (1976) that the formulations enabled better control over the spatial arrangement of the coupling agent about the surface of the reinforcement material.

Efforts to improve the compatability of organic polymers and resins with pre-heated coal fly ash are disclosed in U.S. Pat. No. 4,336,284 (1982) as partially covering coal fly ash with an essentially hydrophobic mono-molecular partial coating of a chemical agent, the thickness being under 100 Å.

In the past, efforts to dissipate and control static electrical build-up necessitated use of carbon powder fillers in composite materials. These composite materials, laden with carbon, were used to prevent static electricity build-up in hospitals and, for example, computer centers. Disadvantageously, however, such composites exhibited poor physical properties.

SUMMARY OF THE INVENTION

The present invention pertains to a process and a product. The process provides means for producing metal-coated hollow microspheres by vigorously admixing hollow microspheres with an adhesive binder to coat the hollow microspheres, adding metal flakes to the thus coated hollow, slowly and uniformly heating the microspheres-binder-metal intermediate product until it reaches a temperature of up to about 350° F., thereafter intermittently admixing or tumbling the heated hollow microsphere-binder-metal intermediate product in the absence of further heating until the binder is cured, and followed by product recovery.

An object of the present invention is to provide a simple process for preparing a metal-coated hollow microsphere.

Yet another object of the present invention is to prepare a unique metal-coated hollow microsphere wherein there is an exposed metal surface.

Still another feature of the present invention is to provide metal-coated hollow microsphere suitable for a wide variety of end-use applications. Applications include dissipative ingredients, marine coatings/paints, glassy concrete, EMI shielding, and RFI shielding.

It is still yet another object of the present invention to provide a process that obviates the need for acid-pretreatment of hollow microspheres prior to use.

Other objects, features, and characteristics of the present invention as well as the method and operation thereof will become more apparent upon consideration of the following description and the appended claims all of which form a part of this specification.

DETAILED DESCRIPTION OF THE INVENTION

The process of the present invention may be broadly characterized as composed of the following combination of steps. A selected quantity of hollow microspheres is vigorously admixed and blended with an adhesive binder, preferably a thermosetting adhesive binder, until the hollow microspheres are wet-out, i.e. coated with the adhesive binder. Next, the desired metal, in the form of flakes, is slowly added to the wet-out hollow microspheres thereby providing metal-coated hollow microspheres with exposed metallic surfaces. Subsequently, the metal flakes are permanently bound to the hollow microspheres by curing the binder. The curing is obtained by slowly and uniformly heating the reaction vessel to raise its temperature up to a maximum of about 350° F. Following the curing procedure the metal coated hollow microspheres are intermittently mixed or intermittently tumbled in the absence of any further heating until the metal-coated hollow microspheres are dry. The product is then recovered.

The process for preparing a metal-coated hollow microsphere can advantageously be characterized as comprising the combination of steps (a) vigorously admixing a major quantity of hollow microspheres with about 3 to about 6 weight percent (based on the final product) of a thermosetting binder adhesive until the hollow microspheres are wet-out; (b) slowly adding metal flakes having an average size of 6 to 10 microns to the thus wet-out hollow microspheres of step (a) until the wet-out hollow microspheres are fully coated with the metal flakes; (c) binding metal flakes to the wet-out hollow microspheres by slowly applying heat to raise the temperature of the metal coated-hollow microspheres from step (b), the temperature is raised up to between about 220° F. to about 240° F.; and (d) the metal-coated microspheres of step (c) are intermittently admixed in the absence of any further heating until the metal-coated microspheres are dry.

During the initial admixing of the raw microspheres with the binder, heat may be applied to raise the mixture temperature up to about 120° F. to about 180° F. Preferably this temperature ranges between 140° F. and 160° F. As will thus be appreciated, the present process is essentially solvent-less.

In the aforedescribed process, the adhesive binder is first introduced into the mixing vessel containing a quantity of cenospheres, i.e. microspheres. Suitable techniques for applying the binder to the microspheres include the spray or misting methods plus direct pouring. The adhesive may thus be introduced into the vessel in the form of a mist, liquid or vapor. During this application, however, there should be vigorous admixing, i.e. agitation, of the microspheres and adhesive binder to insure proper coating of the microspheres.

Next, the desired quantity of metal flakes are added to the mixing vessel. Preferably, the flakes are slowly added. The metal flake addition continues until the microspheres, previously coated with the uncured adhesive binder, are fully covered by metal flakes. The metal flakes tend to stick to the uncured adhesive binder. An acceptable and suitable metal flake coating is readily determined by visual inspection. For more critical end-use applications, more control may be required and in such cases inspection of periodic samples, for example, under a 40 power microscope is an exemplary control technique.

Exemplary end use applications of the products of the present process include:

(a) use in composite materials to control static electricity in critical applications such as in operating rooms and aircraft;

(b) use in shielding layers in microcircuitry, such as printed circuit boards;

(c) use in molding wherein either solid or flexible substrates require an outer layer having electrically conductive properties for radio frequency shielding. Suitable molding techniques are injection molded or in the powdered-in-mold-coating technique.

The hollow microspheres suitable for use in the present process include a wide variety of commercially-graded microsphere products. Exemplary suitable hollow microspheres, generally have average particle sizes ranging from about 60 microns up through 180 microns. Such suitable hollow microspheres may, of course, have individual particles having larger diameters, but generally the average diameter falls within the above-stated range. More particularly, the hollow microspheres have an average particle size diameter ranging between 100 microns and 180 microns and still more particularly from 100 to 150 microns. Most advantageously, the microspheres have a narrow distribution of average particle sizes. The size of the hollow microspheres employed in the present process, from an average diameter particle size perspective, will affect the weight percent of the metal flakes employed in the present process. The larger hollow microspheres will require greater quantities of metal flakes.

Advantageously, hollow fly ash microspheres are employed in the present process to produce the present products. Such hollow microspheres exhibit high compressive strengths and thus can withstand considerable amounts of shear generated in intensive mixing. An exemplary fly ash hollow microsphere suitable for use herein is described, constituents wise, in Table I.

TABLE I

| Chemical Analysis of Typical Fly hollow Ash Microspheres | |
| --- | --- |
| Ingredient | % By Weight |
| Silica (as $SiO_2$) | 55.0–66.0 |
| Alumina (as $Al_2O_3$) | 25.0–30.0 |
| Iron Oxides (as $Fe_2O_2$) | 4.0–10.0 |
| Calcium (as CaO) | 0.2–0.6 |
| Magnesium (as MgO) | 1.0–2.0 |
| Alkalai (as $Na_2O$, $K_2O$) | 0.5–4.0 |

The hollow microspheres are essentially dry; such core materials are thus, preferably, substantially water-free prior to use in the present process.

In the present process, the microspheres are admixed with about 3 to about 6 weight percent of a binder adhesive, based on the final product. The binder adhesive may also be used in a lesser amount ranging from about 3 to about 4 weight percent, again based on the final product.

The adhesive binder employed in the present process is preferably a type of adhesive. More particularly, the binder is composed of an organofunctional silane having an organoreactive radical function that can be polymerized at elevated temperatures along with a reactive diluent. The diluent tends to extend the silane and also copolymerizes with it.

The inorganic moiety of the silane molecule attaches to the microsphere at the lower temperatures described in the admixing step, and is covalently bonded thereto by a hydrolysis reaction. During the binder curing step, the organic moiety of the silane molecule copolymerizes and cross-links with the reactive diluent to form a thermosetting polymer which binds the metal flakes to the hollow microspheres.

An exemplary organofunctional silane product is, for example, 3[2(vinyl benzylamino)ethylamino]propyltrimethoxy silane. Exemplary reactive copolymerizable constituents include, for example, various lactones. An exemplary lactone is, for instance gamma-butyrolactone.

The metal flakes employed in the present process are very small sized. The flakes should have as low an average flake size as feasible. The larger the average flake size, the more difficult it is to provide a smooth finish with a paint or other coating incorporating such hollow microspheres. Also, metal flake to microsphere bonding is inconsistent at large flake sizes. More particularly, the metal flake average size may range from about, for example, 2 microns up through out 10 microns. Preferably, the metal flakes range from about 6 microns to about 10 microns in average size. Advantageously such latter range results in an aesthetically pleasing product suitable for most all desired end-use applications. Suitable metal components of the flakes include, for example, zinc, aluminum, silver, copper, stainless steel, platinum and gold.

Typically, the metal flakes are vigorously blended with the microspheres coated with binder adhesive in an amount ranging from about 15 to about 30 weight percent of the adhesive binder coated hollow microsphere. Particularly, and more preferably, the metal flakes are added in an amount ranging from about 17 weight percent to about 25 weight percent. Most advantageously, the metal flakes are added in an amount of about 18 to about 22 weight percent. This latter weight percent provides most advantageous results when the hollow microspheres have an average particle size average about 165–170 microns. Excessive metal flakes can be easily separated at this stage or during subsequent work-up of the final product.

During the binder curing step, the temperature is preferably raised and maintained at less than about 350° F. and advantageously less than 300° F. More particularly, the temperature is substantially uniformly raised within several minutes until, by visual observation or by other means, it is apparent that the thermosetting binder adhesive commences curing. Typically, after the temperature has been slowly raised up to about 220° F. to about 240° F., the binder will commence curing within a matter of a few minutes. In large production runs, this step may be thermostatically controlled in conjunction with suitable timing mechanisms.

The heating is critical. Excessive caloric application or an excessive rate of application thereof leads to improperly cured products and defects. Defects result, for example, since the coefficient of expansion for the metals exceeds that of the hollow microsphere. Thus, excessive heat expands the metal flake and breaks the metal flakes loose from the microsphere during, for instance, step (c).

After the binder commences curing, the curing product is very carefully but intermittently tumbled or admixed on a cycle basis. The intermittent tumbling or cycling may occur off and on for several minutes or longer. For example, in a blender, mixer, or other similar conventional apparatus, the curing products are left in a non-agitated state for a few minutes, admixed or tumbled for a very brief period or time, on the order of half minutes, followed by a non-agitated state. This intermittent cycling or admixing/tumbling may occur about 15–20 times during this step of the present inventive procedure. During this step various by-products such as, for example, water of hydration or methyl alcohol are removed. In addition, the intermittent admixing or tumbling insures that the binder adhesive properly cures while at the same time the metal flakes are not split off the microspheres.

The products of the present process have excellent physical properties and unexpectedly can replace up to about 10 times their weight of plain metal in conventional applications. In addition, dissipative coatings containing such products have advantageous properties.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims, which scope is to be accorded the broadest interpretation so as to encompass such modifications and equivalent structures.

What is claimed is:

1. A process for preparing metal-coated hollow microspheres comprising the combination of steps of:
   (a) vigorously admixing a major quantity of hollow microspheres with a thermosetting binder adhesive until said microspheres are wet-out, said hollow microspheres having an average particle size diameter ranging from about 60 microns to about 180 microns;
   (b) slowly adding metal flakes to the thus wet-out microspheres from step (a) until said wet-out microspheres are coated with said metal flakes;
   (c) applying heat and slowly increasing the temperature of the metal-coated microspheres from step (b) up to about 350° F. to thereby cure said binder and bind said metal flakes to said microspheres; and
   (d) intermittently mixing-agitating the metal-coated microspheres from step (c) in the absence of any further heating until said metal-coated microspheres are dry.

2. Process according to claim 1, wherein said thermosetting binder adhesive is composed of a polymerizable organo-silane composition and a copolymerizable monomer or copolymer.

3. Process according to claim 2, wherein said polymerizable organo-silane is 3[2(vinyl benzylamino)ethylamino]propyltrimethoxy silane and said copolymerizable monomer is gamma-butyrolactone.

4. Process according to claim 1, wherein said thermosetting binder adhesive is added in amount about 3 to about 4 percent by weight of the final product.

5. Process according to claim 1, wherein said metal flakes have an average size of about 6 microns to 10 microns.

6. Process according to claim 1, wherein said hollow microspheres have an average particle size of about 100 microns to about 150 microns.

7. Process according to claim 1, where in said step (c) the temperature is raised to about 220° F. to about 240° F.

8. Process according to claim 1, where in step (a) heat is applied until a temperature of about 140° F. to about 160° F. is obtained.

9. Process according to claim 1, wherein said metal flake is composed of zinc, aluminum, silver, copper, stainless steel, platinum, gold or a combination thereof.

10. A process for preparing metal-coated hollow microspheres comprising the combination of steps of:
    (a) vigorously admixing a major quantity of hollow microspheres having an average particle size diameter ranging from about 60 microns to about 180 microns with about 3 to about 6 weight percent, based on the weight of the final product, of a thermosetting binder adhesive comprising an organo functional silane and a copolymerizable monomer, until said microspheres are wet-out;
    (b) slowly adding metal flakes to the thus wet-out microspheres from step (a) until said wet-out microspheres are coated with said metal flakes, said metal flakes having an average particle size of about 6 microns to about 10 microns;
    (c) applying heat and slowly increasing the temperature of the metal-coated microspheres from step (b) up to about 350° F. to thereby cure said binder and bind said metal flakes to said microspheres; and
    (d) intermittently mixing-agitating the metal-coated microspheres from step (c) in the absence of any futher heating, until said metal-coated microspheres are dry.

11. Process according to claim 10, where in step (b) about 15 to about 30 weight percent metal flakes, relative to said wet-out microspheres from step (a), are employed.

12. Process according to claim 11, wherein said mircospheres have an average particle size of about 165 to 170 microns and about 18 to about 22 weight percent metal flakes, relative to said wet-out microspheres from step (a), are employed.

13. Metal-coated hollow microspheres obtained by:
    (a) vigorously admixing a major quantity of hollow microspheres having an average particle size diameter ranging from about 60 microns to about 180 microns, with about 3 to about 6 weight percent, based on the weight of the final product, of a thermosetting binder adhesive, said adhesive comprising an organo functional silane and a copolymerizable monomer, until said microspheres are wet-out;
    (b) adding metal flakes to the thus wet-out microspheres from step (a) until said wet-out microspheres are coated with said metal flakes, said metal flakes having an average particle size of about 2 microns to about 10 microns;
    (c) applying heat and slowly increasing the temperature of the metal-coated microspheres from step (b) until a temperature of up to about 350° F. is reached to thereby cure said binder and bind said metal flakes to said microspheres; and
    (d) intermittently admixing-agitating the metal-coated microspheres from step (c) in the absence of further heating until said metal-coated micrspheres are dry after which said metal-coated microspheres are recovered as product.

14. Process according to claim 2, which also includes:
pre-heating said microspheres and said binder in said step (a) and continuing said pre-heating treatment until a temperature of about 140° F. to 160° F. is obtained;
raising the temperature in said step (c) to about 220° F. to about 240° F.; and
said hollow microspheres having an average particle size diameter of about 100 microns to about 180 microns and said metal flakes having an average particle size of about 6 microns to about 10 microns comprising zinc, aluminum, silver, copper, stainless steel, platinum, gold or a mixture thereof.

15. Process according to claim 14 wherein said thermosetting binder adhesive is 3 propyltrimethoxy silane and said copolymerizer monomer is gamma-butyrolactone.

16. The process according to claim 10, wherein:
heat is applied in step (a) until the mixture of said hollow microspheres and said binder is heated to a temperature of about 140° F. to about 160° F.; and
the temperature in said step (c) is raised to about 220° F. to about 300° F.,
said hollow microspheres having an average particle size diameter ranging from about 100 microns to about 180 microns,
said metal flakes being composed of zinc, aluminum, silver, copper, stainless steel, platinum, gold or a combination thereof.

17. Metal-coated hollow microspheres, comprising non-conductive hollow microspheres having an average particle size diameter ranging from about 60 microns to about 180 microns, metal flakes substantially coating individual said hollow microspheres, said metal flakes having an interior surface bound to an exterior surface of a hollow microspheres by a thermosetting binder adhesive.

18. Metal-coated hollow microspheres according to claim 17 wherein said hollow microspheres have an average particle size diameter of about 100 microns to about 180 microns, said metal flakes have an average particle size of about 6 microns to about 10 microns, and said thermosetting binder adhesive comprises the reaction product of an organo functional silane and a copolymerizable monomer.

19. Metal coated hollow microspheres according to claim 18 wherein said metal flakes are composed of zinc, aluminum, silver, copper, stainless steel, platinum, gold or a combination thereof.

20. Metal coated hollow microspheres according to claim 17 wherein said metal coated hollow microspheres have an average particle size diameter ranging from about 100 microns to about 150 microns.

* * * * *